United States Patent [19]

Khan

[11] Patent Number: 4,962,034
[45] Date of Patent: Oct. 9, 1990

[54] BIOREMEDIATION OF ORGANIC CONTAMINATED SOIL AND APPARATUS THEREFOR

[75] Inventor: Khalique A. Khan, Pasadena, Calif.

[73] Assignee: Aerovironment, Inc., Monrovia, Calif.

[21] Appl. No.: 323,798

[22] Filed: Mar. 15, 1989

[51] Int. Cl.⁵ .............................................. C12M 1/06
[52] U.S. Cl. ......................................... 435/262; 71/6; 435/299; 435/287; 435/313; 435/315
[58] Field of Search ............... 435/299, 313, 262, 287, 435/315; 71/6

[56] References Cited

U.S. PATENT DOCUMENTS

| 947,333 | 1/1910 | Hamilton . | |
|---|---|---|---|
| 3,325,008 | 6/1967 | Lancy . | |
| 3,425,555 | 2/1969 | Ridgeway . | |
| 3,978,673 | 9/1976 | Schleede . | |
| 4,086,167 | 4/1978 | Tapola et al. . | |
| 4,169,050 | 9/1979 | Serfling et al. . | |
| 4,224,155 | 9/1980 | Milne . | |
| 4,323,367 | 4/1982 | Ghosh . | |
| 4,401,569 | 8/1983 | Jhaveri et al. . | |
| 4,448,690 | 5/1984 | Maphis . | |
| 4,582,611 | 4/1986 | Wang . | |
| 4,584,102 | 4/1986 | Bogart et al. . | |
| 4,600,508 | 7/1986 | DeGhetto . | |
| 4,611,950 | 9/1986 | Russomano . | |
| 4,668,388 | 5/1987 | Dibble et al. . | |
| 4,745,850 | 5/1988 | Bastian et al. . | |
| 4,798,802 | 1/1989 | Ryan | 435/313 |
| 4,849,360 | 7/1989 | Norris et al. | 435/313 |

Primary Examiner—Sam Rosen
Attorney, Agent, or Firm—William W. Haefliger

[57] ABSTRACT

A trickling filter system to treat contaminated soil, and prevents its migration, comprises: a reactor vessel having a floor, a side wall or walls, and a cover, to contain the soil; a contaminated soil bed received into the vessel and onto the vessel floor; a raking apparatus including rake arms in the vessel and a drive therefore, to displace the arms for raking the soil; and a sprinking system in the vessel to sprinkle liquid into the raked soil, and; a sump associated with the reactor vessel to receive liquid that drains from the soil, and to supply that liquid to said sprinkling system, the liquid including water and organics dissolved in the water.

15 Claims, 2 Drawing Sheets

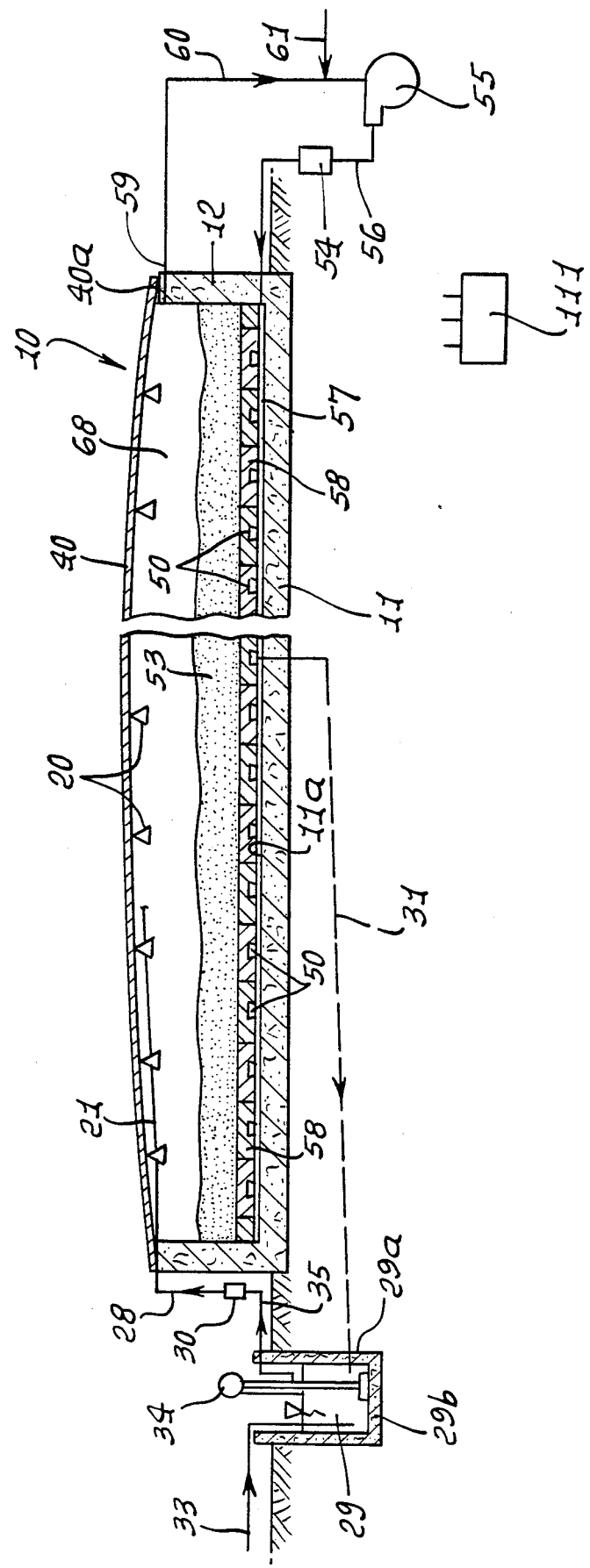

BIOREMEDIATION OF ORGANIC CONTAMINATED SOIL AND APPARATUS THEREFOR

BACKGROUND OF THE INVENTION

This invention relates generally to bioremediation processes, and more particularly to bioremediation of organic contaminated soil under controlled conditions.

Traditionally, the bioremediation (Landtreatment) process involved treating the contaminated soil by spreading it on or into the soil and tilling it periodically. This process decontaminates the soil by uncontrolled emissions of volatile organics into the atmosphere, and the biodegradation of the remaining contaminants. Decontamination in this manner poses the problem and threat of contaminant migration into the air, ground and groundwater.

SUMMARY OF THE INVENTION

It is a major object of the invention to provide process and apparatus for overcoming the above problems and threat of contamination migrations.

It is another object of the invention to provide a reactor in which to provide for treatment of contaminated soil, and characterized by:

(a) a raking means to receive and keep the soil mixed and aerated;

(b) a sloping bottom facilitating collection of leachate formed during decontamination;

(c) an external sump that collects the leachate, and supplies water for a spray system that keeps the soil moist, in the reactor, and which also re-circulates soluble organics to the soil mass for treatment;

(d) a timer system for operation of the raking means and water supply to the spray system;

(e) blockage of migration of contaminants from the reactor;

(f) a cover over the reactor interior, whereby that interior is enclosed.

It is a further object of the invention to provide for treatment of contaminated soil by use of a sludge drying bed in the waste water treatment. A walled configuration stores the soil mass and finely perforated plastic blocks are placed on the concrete floor which support the weight of the contaminated soil. Air diffusers, connected to an external air blower, are placed under the porous blocks, and a blower supplies oxygen, through the diffuser system and the porous plastic blocks, for effecting soil biodegradation.

An external sump is provided to collect leachate and supply water to be sprayed on top of the soil mass to keep it moist. The entire system is enclosed to control the release of volatile organics. A water spray system recirculates the accumulated volatile organics, under an impermeable dome and through the soil mass, so that these organics are also biodegraded.

These and other objects and advantages of the invention, as well as the details of an illustrative embodiment, will be more fully understood from the following specification and drawings, in which:

DRAWING DESCRIPTION

FIG. 2 is an elevation, in section, showing a sludge drying bed system.

DETAILED DESCRIPTION

Figure 1:
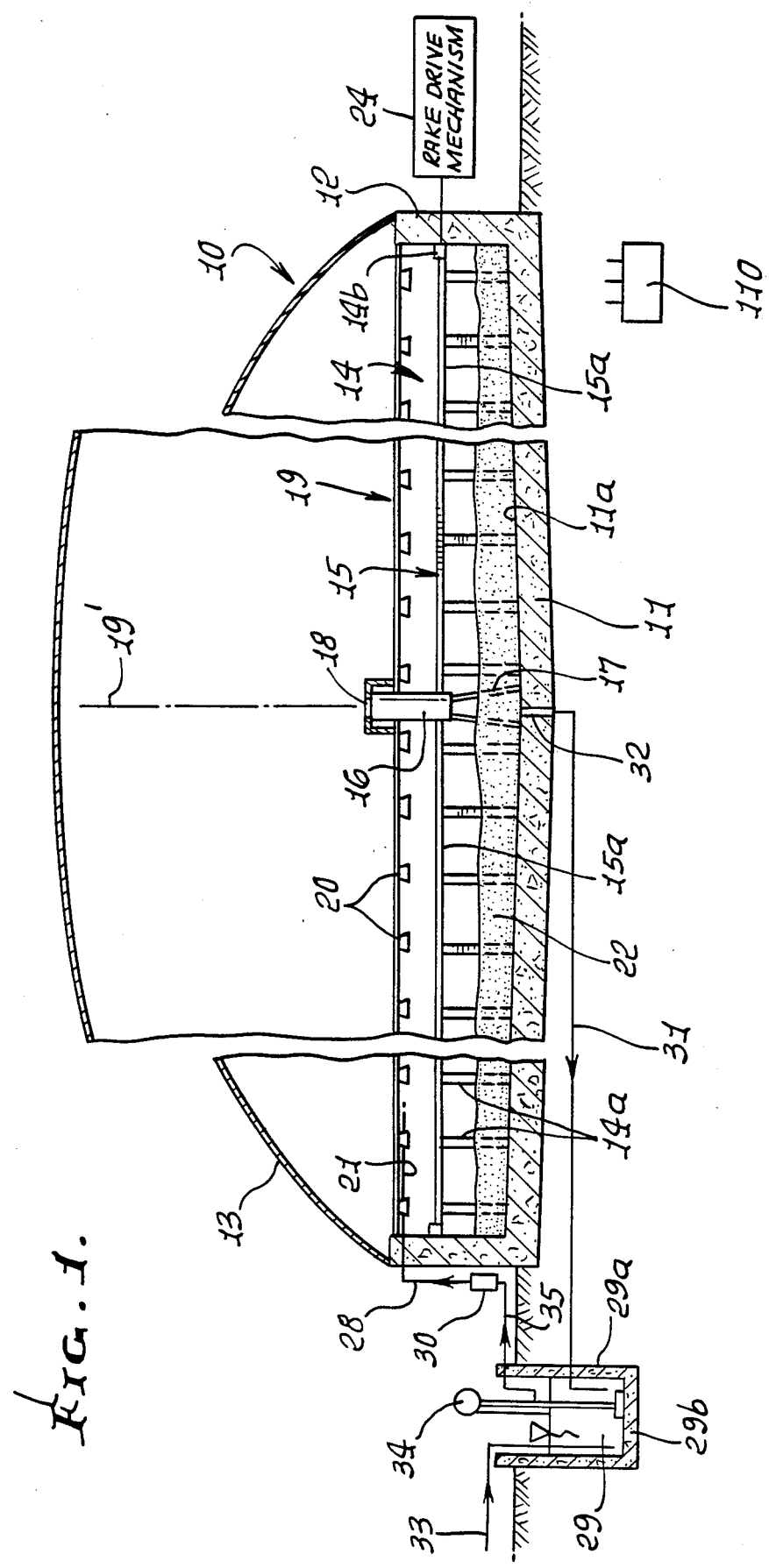
FIG. 1 is an elevation, in section, showing a trickling filter system.

In FIG. 1, the trickling filter system shown includes a large reactor vessel 10 having a bottom wall 11 defining a floor 11a, a side wall or walls 12, and an impermeable cover 13 in the shape of an overhead dome. The walls 11 and 12 typically consist of impermeable concrete or metal in cylindrical form to permit circular travel of a raking apparatus indicated at 14. That apparatus is shown to include a rake arm 15 having equal length segments 15a extending radially oppositely from a central rotary bearing 16. Legs 17 or other support means supports the bearing 16 on the bottom wall. A thrust bearing 18 riding on bearing 16 supports a catwalk beam 19 which in turn supports water sprinklers. A number of such non-rotary beams extend at different angles about upright central axis 19', and support water sprinklers indicated at 20. Suitable water supply ducts 21, carried by the beam 17, extend to the sprinklers.

A bed of contaminated soil (oil contamination, or PCB contamination, or other hydrocarbon contamination as for example organic material and insect killer) is indicated at 22, spread over the bottom wall 11 at approximately uniform depth. That soil is raked by radially spaced blades 14a depending from the rake arm segments 15a, there being the same number of such blades on each side of the central axis, for balance of the raking apparatus. A controllable peripheral drive for the rake apparatus is indicated at 24, and may drive a small gear that meshes with peripheral teeth carried by an annular ring 14b integral with the raking apparatus. Note that the blades 14a project downwardly into the soil bed.

As the raking apparatus is slowly rotated, and as the water is sprinkled into the bed, bacteria grow and proliferate in the bed, consuming and destroying the hydrocarbon contaminant Water supplied at 28 to the ducts 21 from a sump 29 may be temperature controlled at 30 for optimum control of the soil temperature in the bed, to promote bacteria growth The sump is located outside the reactor vessel, and includes a concrete or metallic side wall 29a and bottom wall 29b Water is supplied to the sump via a drain line 31 from a drain at the center of the bottom wall 11. The floor 11a is inclined, conically, toward the outlet 32 at the center of wall 11. Thus, organic material in the water seeping through the bed is returned to the sump, for return to the vessel 10 via the sprinkler system. Make-up water is supplied to the sump at 33 Pump 34 draws liquid from the sump and passes it to line 35 leading to duct 21.

It will be noted that the vessel and system prevent migration of the contaminated soil to the nearby environment. Treated soil may be periodically removed, and replaced by untreated, contaminated soil.

The system shown in FIG. 2 is similar in many respects to that seen in FIG. 1. Vessel 10 includes walls 11 and 12, as before. Cover 40 is dome shaped, but shallow, and supports the sprinklers 20 and ducts 21 associated with the cover. The cover may be stiff, and supported at its rim 40a by the wall 11. Liquid is supplied to the sprinkler ducts, as before, the elements numbered the same. However, only enough water is supplied to moisten the soil, for bacteria growth, so that no drain is used. An optional drain is indicated at 31, as before.

Ports 50 are provided just above the floor, and means is provided to supply fresh air to the ports for distribution upwardly into the soil bed 53, supplying oxygen to the bacteria. The air may be temperature controlled at 54, for optimum growth of bacteria in the soil, consuming hydrocarbon and other contaminants therein. Such air supply means is shown in the form of a blower 55 discharging to line 56 leading to diffuser ducts 57 at the undersides of blocks 58 that contain or define the ports 50. Blocks 58 may define the ducts 57, and are seated on surface 11a. No raking of the soil bed 53 is needed. Air percolating upwardly from the soil into upper interior 68 passes to outlet 59 for return at 60 to the blower. Fresh make-up air is added at 61. Treated soil is periodically removed, and replaced by untreated soil.

Of unusual advantage are the following:

1. In FIG. 1 system, the mixing system provides good contact between the contaminated soil and the bacteria in the soil, and keeps the soil well mixed and aerated. This improves the treatment efficiency, and reduces the time of soil decontamination, and thus reduces the overall cost.

2. In the FIG. 2 system, the recirculation of accumulated volatile organics through the soil mass under the domed structure helps biodegrade these organics. This, therefore, eliminates the need to capture these volatile organics and treat them separately, and thus reduces cost.

3. The systems of both FIGS. 1 and 2 control the migration of contaminants, thus eliminating the possibility of pollution of the subsurface soil and the groundwater.

4. The water sprinkler system keeps the soil moisture content at optimum level; it may be operable remotely; and it eliminates human contact with the contaminated soil.

The described systems achieve the objective of soil decontamination by providing treatment under controlled conditions, eliminating the release of volatile organics in the atmosphere, and controlling the migration of pollutants. Such systems are most cost effective than incineration and off-site disposal. Such soil normally contains decontaminating microorganisms.

Timer systems for the pumps, blower, rake drive, and heaters, are indicated at 110 and 111.

I claim:

1. A trickling filter system to treat contaminated soil containing de-contaminating microorganisms, and that prevent its migration, the system being closed to control release of organics, comprising
    (a) a reactor vessel having a floor, a side wall or walls, and a cover, to contain the soil,
    (b) a contaminated soil bed received into the vessel and onto the vessel floor,
    (c) a rotary raking apparatus including rake arms in the vessel, and a rotary drive therefor, to rotatably displace the arms for raking the soil, the rake arms supported to project downwardly into the soil, from the vessel interior thereabove,
    (d) and a sprinkling system in the vessel to sprinkle liquid onto the raked soil, and
    (e) a sump associated with the reactor vessel to receive liquid that drains from the soil, and to supply said liquid to said sprinkling system,
    (f) said liquid including water and organics dissolved in the water,
    (g) and oxygenating means associated with said vessel.

2. The system of claim 1 wherein said floor slopes relative to horizontal to drain liquid for flow to the sump, the sump being outside the reactor vessel.

3. The system of claim 2 wherein the floor consists of concrete.

4. The system of claim 1 wherein the side wall is circular to define an upright axis, and said raking apparatus is mounted to rotate about said axis.

5. The system of claim 4 including a peripheral drive for said raking system.

6. The system of claim 4 wherein said raking system includes a central support, supporting said raking system for rotation, and said system includes a generally horizontal arm, and blades depending from said arm, the arm extending at opposite sides of said axis.

7. The system of claim 1 wherein the bed has substantially the same depth, over said floor.

8. The method of operating the system as defined in claim 1 that includes
    (i) pumping liquid from the sump to said sprinkling system for distribution onto soil in the bed,
    (ii) operating the drive to displace the rake arms for raking the soil in the bed,
    (iii) and draining liquid from the bed into the sump.

9. The method of claim 8 including blocking travel of the soil from said vessel during said operation of the system.

10. An aeration system to treat contaminated soil containing de-contaminating microorganisms, and that prevent its migration, the system being closed to control release of organisms, comprising
    (a) a reactor vessel having a floor, a side wall or walls, and a cover, to contain the soil,
    (b) a contaminated soil bed received into the vessel and onto the vessel floor, and means for agitating said soil,
    (c) ports including permeable blocks at said floor and means to supply fresh air to said ports for distribution upwardly into the bed,
    (d) a sprinkling system to sprinkle liquid to fall in the vessel onto the soil in said bed,
    (e) and a sump associated with and exterior of the reactor vessel to receive liquid that drains from the soil, and to supply said liquid to said sprinkling system,
    (f) said liquid including water and organics dissolved into the water.

11. The apparatus of claim 10 including means to circulate air from the vessel interior to said means that supplies air to said ports.

12. The apparatus of claim 11 wherein said means includes a blower, and a duct between the blower and said ports, and said agitating means including a rake system including a horizontal beam, and rake arms penetrating into the soil and supported by the beam, and means for delivering rotary power for displacing said arms in the soil.

13. The apparatus of claim 10 wherein the bed has substantially the same depth, over said floor.

14. The method of operating a system as defined in claim 10 that includes
    (i) pumping liquid from the sump to said sprinkling system for distribution into soil in the bed,
    (ii) and operating said means to supply air to said ports.

15. The method of claim 14 wherein only enough moisture is distributed to moisten the soil to promote bacterial growth.

* * * * *